No. 745,946. Patented December 1, 1903.

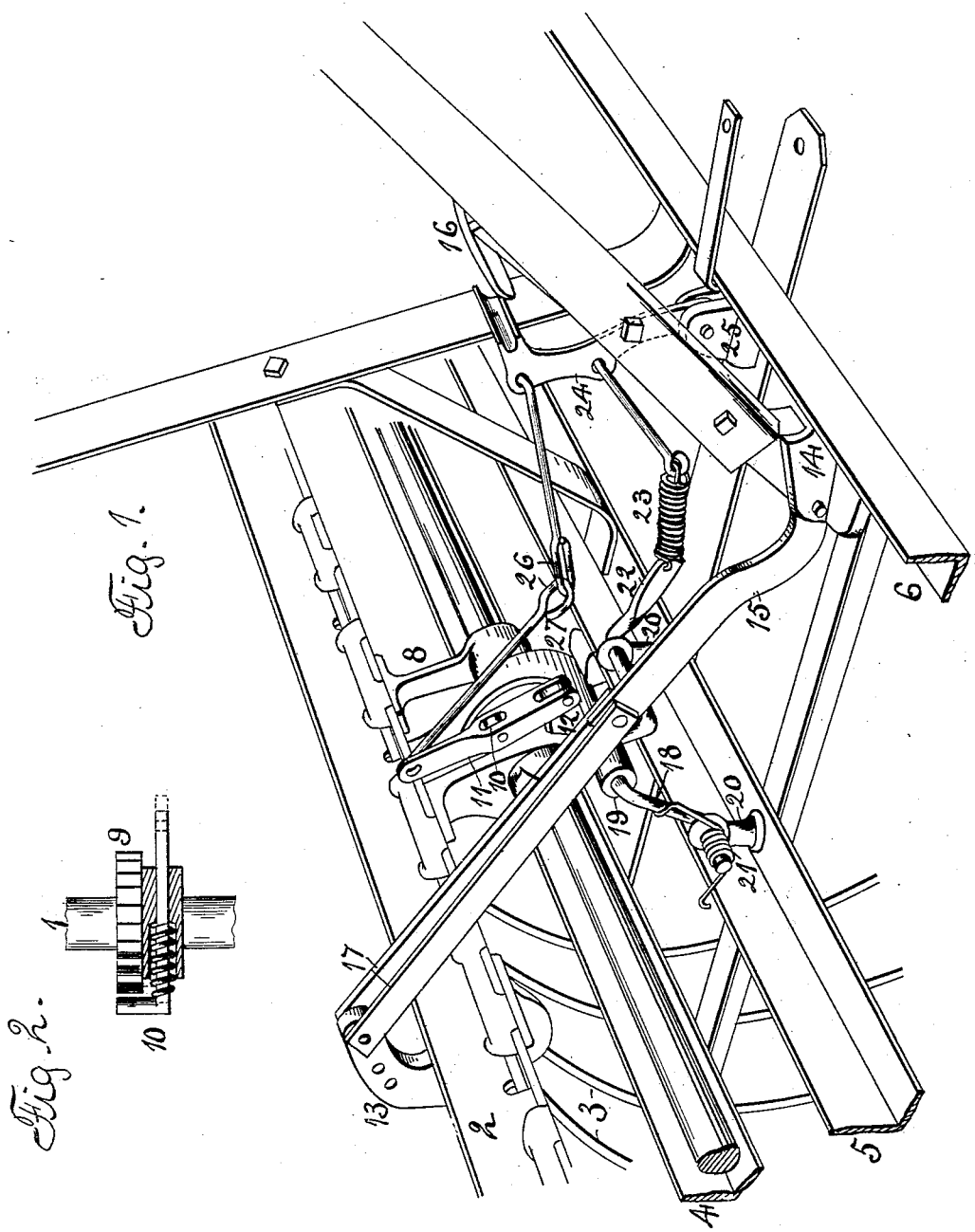

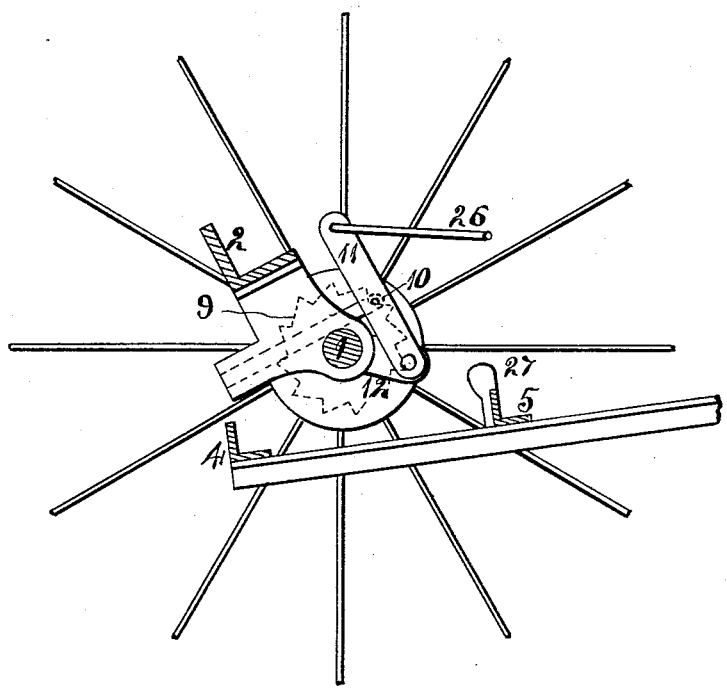

UNITED STATES PATENT OFFICE.

GEORGE WILSON, OF ROCKFORD, ILLINOIS, ASSIGNOR TO EMERSON MANUFACTURING COMPANY, OF ROCKFORD, ILLINOIS.

HORSE HAY-RAKE.

SPECIFICATION forming part of Letters Patent No. 745,946, dated December 1, 1903.

Application filed September 30, 1901. Serial No. 77,119. (No model.)

*To all whom it may concern:*

Be it known that I, GEORGE WILSON, a citizen of the United States, residing at Rockford, in the county of Winnebago and State of Illinois, have invented certain new and useful Improvements in Horse Hay-Rakes, of which the following is a specification.

This invention relates to a class of horse hay-rakes in which the teeth are held down in working position and just after they are released a connection is formed between the revolving axle and rake-head in order that the teeth may be raised to dump the load.

In the accompanying drawings, Figure 1 is a perspective view of the operative parts of my improved horse hay-rake. Fig. 2 is a horizontal section of the clutch connection between the rake-head and axle. Fig. 3 is a lengthwise section showing the clutch arrangement and stop 27.

The framework of my improved horse hay-rake is old and comprises the axle 1, rake-head 2, rake-teeth 3, and the lengthwise angle-bars 4, 5, and 6, forming the tongue and seat-supporting frame, which is pivotally supported by the axle, by the bracket 7, and other brackets. (Not shown.) The rake-head 2 is pivotally supported by the axle, by the bracket 8, and other brackets. (Not shown.) To the axle is secured a ratchet-wheel 9. A dog 10 has a pivotal connection at one end with a lever 11, and the lever has a pivotal connection with the bracket 12. To the rake-head is secured a bracket 13, having a series of holes.

To the angle-bar 6 is secured a bracket 14, and to this bracket is pivotally connected a link 15 intermediate its ends, one end supporting a foot-rest 16 and its other end pivotally connected to the links 17, having their other ends connected to the bracket 13.

Beneath the link connection between the rake-head and tongue-supporting frame is located a crank 18, supporting a roller 19. This crank is pivotally supported in bearings 20, the bearings supported by the angle-bar 5. A coiled spring 21 surrounds one end of the crank, one end of the spring resting against the crank and the other end hooked over the angle-bar 5. The other end of the crank has an arm 22, to which is connected a coiled spring 23. The other end of this coiled spring has a connection with a foot-lever 24, the foot-lever having a pivotal connection with the bracket 25, secured to the angle-bar 6. Rods 26 form a connection between the foot-lever and the lever 11 of the clutch mechanism, forming a connection between the axle and rake-head.

The coiled spring 21 serves to hold the crank 18 in an upright position under the link connection between the rake-head and tongue-supporting frame, thereby holding the teeth down in working position. The arm 22, coming in contact with the bar 5, serves as a stop.

When it is desired to raise the teeth and dump the load, the attendant presses forward on the foot-lever 24, which through the spring 23 will rock the crank 18 backward against the action of the spring 21, which will allow the link connection to drop at its center. A further movement of the foot-lever will move the dog 10 into engagement with the ratchet-wheel 9, and the rotary movement of the axle will cause the rake-head to raise and dump the load. When the arm 11 comes in contact with the stop 27, the dog 10 will be forced free of the ratchet-wheel and the teeth allowed to drop, which will straighten the link connection between the rake-head and tongue-supporting frame. The spring 21 will raise the crank under the link connection, thereby holding the link connection elevated, but does not cause the links to reach the dead-center.

I claim as my invention—

1. In a horse hay-rake, the combination of a rake-head, an axle, a tongue-supporting frame, two links pivotally connected, one link pivotally connected to the rake-head and the other link pivotally connected to the tongue-supporting frame, a crank having a pivotal connection with the tongue-supporting frame and located beneath the link connection, a spring holding the crank under the link connection, a lever, and a connection between the lever and crank.

2. In a horse hay-rake, the combination of a rake-head, an axle, a tongue-supporting frame, two links pivotally connected, one link pivotally connected to the rake-head and the other link pivotally connected to the tongue-supporting frame, a crank having a pivotal connection with the tongue-supporting frame and located beneath the link connection, a spring holding the crank under the link connection, a lever, and a spring connection between the lever and crank.

GEORGE WILSON.

Witnesses:
A. O. BEHEL,
E. BEHEL.